US011299410B2

(12) United States Patent
Leung (10) Patent No.: US 11,299,410 B2
(45) Date of Patent: Apr. 12, 2022

(54) WATER FILTER WITH WATER ENRICHMENT

(71) Applicant: STAN-IN PRIVATE LIMITED, Singapore (SG)

(72) Inventor: Kin Yung Leung, Singapore (SG)

(73) Assignee: STAN-IN PRIVATE LIMITED, Singapore (SG)

( * ) Notice: Subject to any disclaimer, the term of this patent is extended or adjusted under 35 U.S.C. 154(b) by 179 days.

(21) Appl. No.: 16/861,199

(22) Filed: Apr. 28, 2020

(65) Prior Publication Data

US 2020/0255309 A1    Aug. 13, 2020

Related U.S. Application Data

(63) Continuation of application No. PCT/SG2017/050541, filed on Oct. 30, 2017.

(51) Int. Cl.

| C02F 1/68 | (2006.01) |
|---|---|
| B01D 15/12 | (2006.01) |
| B01D 36/00 | (2006.01) |
| C02F 1/00 | (2006.01) |
| C02F 1/28 | (2006.01) |
| C02F 1/50 | (2006.01) |

(52) U.S. Cl.
CPC ............ *C02F 1/688* (2013.01); *B01D 15/125* (2013.01); *B01D 36/008* (2013.01); *C02F 1/003* (2013.01); *C02F 1/283* (2013.01); *C02F 1/50* (2013.01); *C02F 2201/003* (2013.01); *C02F 2201/006* (2013.01); *C02F 2303/04* (2013.01); *C02F 2303/185* (2013.01); *C02F 2303/22* (2013.01); *C02F 2307/06* (2013.01)

(58) Field of Classification Search
CPC .... B01D 15/125; B01D 35/04; B01D 36/008; C02F 1/001; C02F 1/003; C02F 1/283; C02F 1/50; C02F 1/68; C02F 1/688; C02F 2201/003; C02F 2201/006; C02F 2301/043; C02F 2303/04; C02F 2303/185; C02F 2303/22; C02F 2307/06; C02F 2307/10; C02F 9/005
See application file for complete search history.

(56) References Cited

U.S. PATENT DOCUMENTS 8,308,942 B2 * 11/2012 Swain .................... C02F 1/003
210/256

FOREIGN PATENT DOCUMENTS

JP          2009018288 A  *  1/2009

* cited by examiner

*Primary Examiner* — Terry K Cecil (57) ABSTRACT

The present invention describes a water filter apparatus (100, 100*a*) with integrated nutrient enrichment and/or enhancement. Desired nutrients, ions, hydrogen ions, ceramic, stones, metal etc. packed in granules or balls are selectively disposed inside a stick capsule (160), shell capsule (180) or hydrogen capsule (190). One or two stick capsules (160) are located inside a filter element (150). The stick capsule has a tapered end (162) and in association with T-shaped posts (157) formed on an inside of a cap (151) of the filter element, dynamic flow of water along the tapered end (162) induces nutrient-rich water to flow through perforations (165) at the end of the stick capsule (160), mixes/blends the two streams of water before water is discharged through a faucet (144). The filtered water is also enhanced by treating the water through flavor treatment, anti-bacterial, anti-chlorine, activated carbon and so on.

24 Claims, 7 Drawing Sheets

WATER FILTER WITH WATER ENRICHMENT

FIELD OF INVENTION

The present invention relates to a cartridge water filter apparatus and a water enrichment system. The filtered water is enriched and/or enhanced by infusing nutrients, minerals, ions, hydrogen and so on before water is discharged for consumption.

BACKGROUND

With greater health awareness, there is a need for more filtered water at home, offices, schools and so on. Existing reverse osmosis and nano-membrane filters are highly effective in removing contaminants but they also remove beneficial calcium, magnesium, etc. Hence, there is a need to enrich or enhance filtered water by remineralizing, adding nutrients, vitamins, herbs, flavours, ions and so on back into the water after filtering. Desirably, the water filter of the present invention gives users flexibility to choose the desired types and combinations of enrichment or enhancement without having to invest money on different filter apparatuses.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention seeks to provide a water filter apparatus and capsules containing desirable nutrients, minerals, ions, hydrogen and so on to enrich or enhance the filtered water. The nutrient-rich water is also mixed and blended in with the filtered water before water is discharged for consumption or use. Desirably, the filter apparatus is compact and has a small footprint. The other advantages are that the filter apparatus does not need electricity to operate and is easy to maintain and clean.

In one embodiment, the present invention provides a water filter apparatus.

In another embodiment, the present invention provides a system for water filtering and enriching.

In yet another embodiment, the present invention provides a kit for a water filter apparatus.

BRIEF DESCRIPTION OF THE DRAWINGS

This invention will be described by way of non-limiting embodiments of the present invention, with reference to the accompanying drawings, in which.

DETAILED DESCRIPTION

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

Figure 1A:
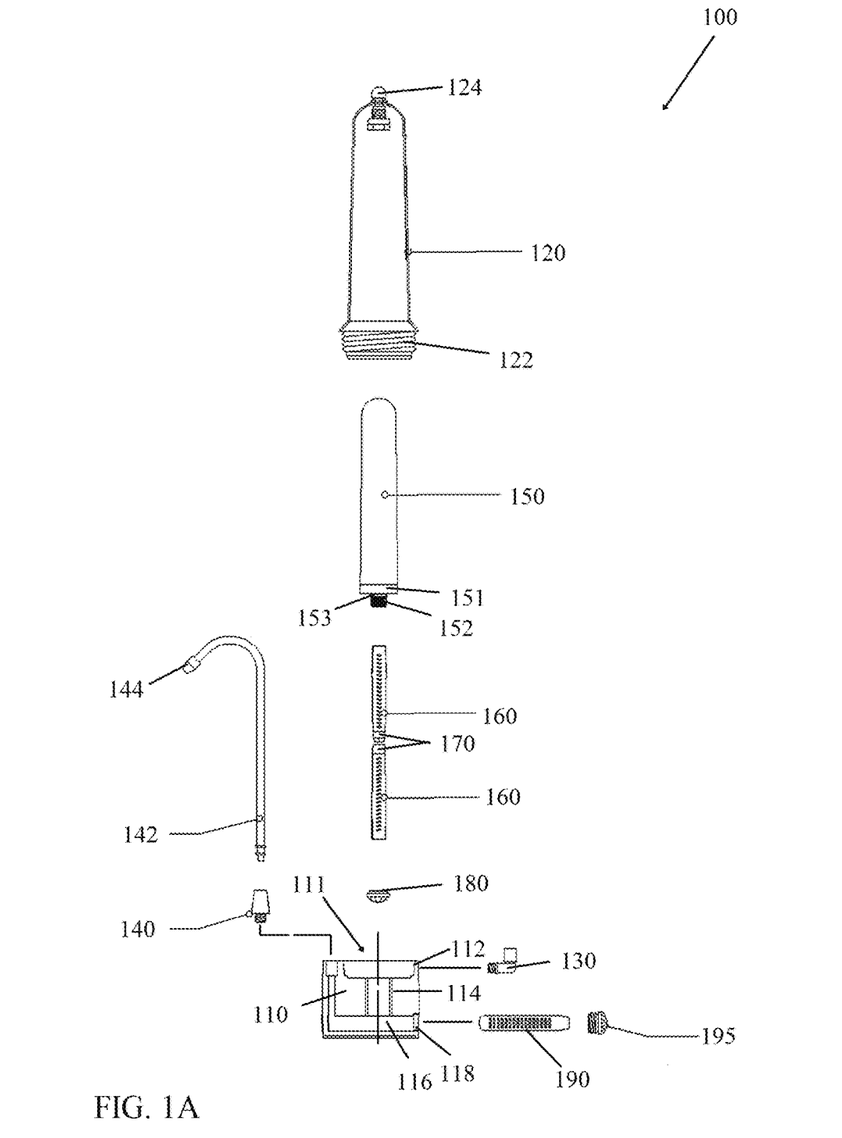
FIG. 1A illustrates an exploded view of a water filter with water enrichment/enhancement according to an embodiment of the present invention.

FIG. 1A shows an exploded view of the water filter 100 according to an embodiment of the present invention. As shown in FIG. 1A, the water filter 100 is made up of a base member 110, a filter housing 120 connected to the base member 110, a filter element 150 disposed inside the filter housing 120 and a stick capsule 160 disposed inside the filter element 150; water, supplied through an inlet fitting 130, flows into the base member 110, fills a volume between the filter housing 120 and filter element 150, and permeates through the filter element 150 and flows into an interior volume of the filter element. Some of the filtered water flows down the exterior of the stick capsule 160 to an interior volume of the base member and then flows out of a faucet 144 through an outlet fitting 140 and spout 142; at the same time, some of the filtered water flows down an interior volume of the stick capsule 160, in which is disposed granules/balls containing desirable nutrients, inorganic ions, organic ions, anti-bacterial surfaces, vitamins, herbs, flavoring, activated carbon and so on, which a user can choose. The filtered water enriched, enhanced and/or infused with some of the desired nutrients, ions, vitamin, herbs or flavour and treated with anti-bacteria, anti-chlorine and so on is dynamically sucked or drawn out through openings 165 (as seen in FIG. 3C) at the lower, tapered end 162 of the stick capsule 160 by a stronger annular flow of filtered water surrounding the exterior, lower end of the stick capsule 160; such induced, suction flow of nutrient-rich water from inside the capsule 160 makes use of Bernoulli's principle but is not limited only by this principle; this dynamically induced suction flow will be clearer when FIG. 3G is described. When a hydrogen capsule 190 is disposed inside a cavity 116 in the base member 110, the nutrient-rich water is further enhanced by releasing into it a certain amount of hydrogen ions contained in the hydrogen capsule 190 before the nutrient-rich water is discharged through the faucet 144.

As seen in FIG. 1A, it is possible that a second stick capsule 160 is connected end-to-end in a butt joint with the (first, lower) stick capsule 160, so that the second stick capsule 160 may contain the same or other desirable nutrients, inorganic ions, organic ions, anti-bacterial surfaces, vitamins, herbs, flavouring and so on, that is/are different from those in the first stick capsule. Some of these nutrient rich granules can be obtained from Shandong Muqi Health Sci-Tech Co. Ltd (contactable at www.imuqi.cn), which may be manufactured according to China patent publication no. CN104607039 (application no. 201510026980.7). Another supplier is Gau-Jiuh International Co., Ltd. (contactable at www.gau-jiuh.com.tw). The nutrient rich granules may be in the form of balls of Tourmaline, oxidation-reduction potential (ORP) negative potential ceramic, negative ion ceramic, mineral water ceramic, Maifanshi stone ceramic, far infra-red stone, magnetic energy, hydrogen rich, micro-porous antibacterial, inhibiting scale, filter ceramic, chlorine removal, hydrogen water media-rolled typed Magnesium metal, and so on.

As seen in FIG. 1A, a stepped-opening 111 is formed on an upper face of the base member 110; the stepped-opening 111 has a big stepped opening and a small stepped opening. A side wall 112 of the big(ger) stepped-opening 111 is threaded to match threads 122 formed on a rim of the filter housing 120. An O-ring or seal (not shown in FIG. 1A) may be disposed at the sidewall 112 or thread 122 to ensure a leak-proof connection.

Also as seen in FIG. 1A, a cap 151 is sealed to closed a lower, open end of the (hollow) filter element 150. If the filter element is open at both ends, an upper cap may be used to seal the upper end, as seen in FIG. 2B. As an eg., the filter element 150 may have a diameter of about 50 mm (or 2 inches) and a length of about 250 mm (or 10 inches). The cap 151 terminates or projects out with an exterior neck 152. An O-ring 153 may be disposed between the cap 151 and the neck 152 for leak-proof sealing. In one embodiment, an exterior surface of the neck 152 is threaded for connection with a thread matching directly on the smal(ler) stepped-opening 111, such as threaded connection 114; such a threaded connection 114 may be of M24 size; in another embodiment, it is possible that the exterior surface of the neck 152 is non-threaded and the plain cylindrical neck 152 is pushed fit into the smal(ler) non-threaded stepped-opening 114.

Figure 1B:
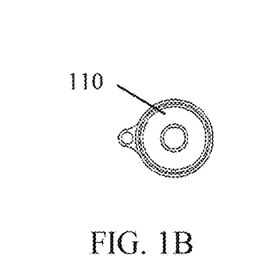
FIGS. 1B-1C illustrate the outline shapes of the base member as seen respectively at the top and bottom.
Figure 1C:
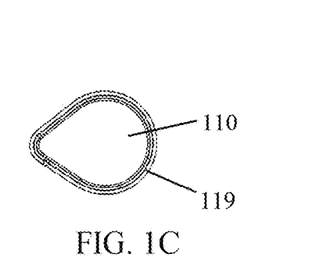

The base member 110 is compact in size. FIG. 1B shows a substantially circular outline at the top of the base member 110 transitioning to a substantially oval outline at the bottom of the base member (as shown in FIG. 1C). In a counter-top embodiment, the bottom of the base member is provided with a luminous silicon ring 119, which makes the base member visible at night. In a below-sink or in-cabinet embodiment, an L-bracket is provided to fix the bottom of the base member to a wall or sidewall.

Figure 2A:
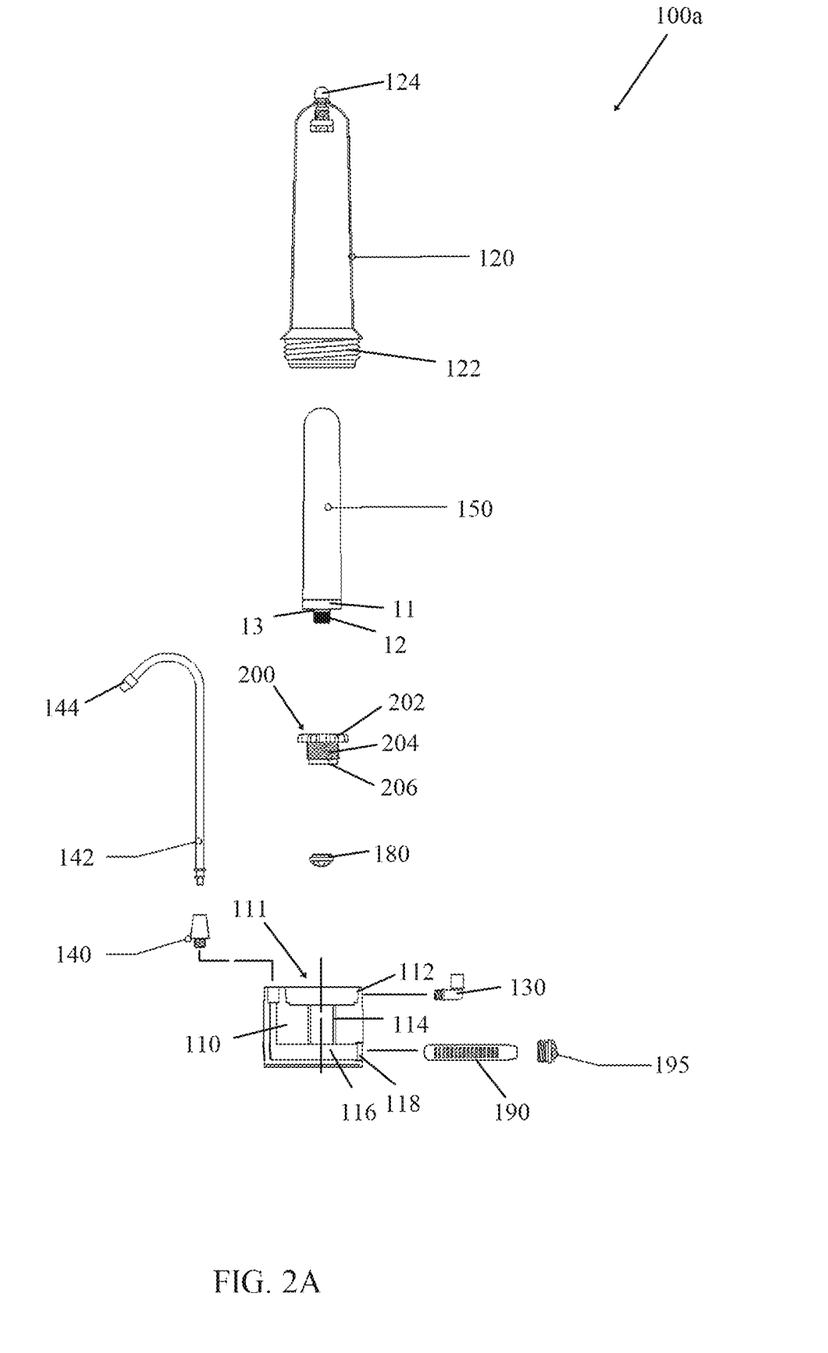
FIG. 2A illustrates a water filter shown in FIG. 1A for use with a screw adaptor matching a fitting of an existing filter element already in use by a user.
Figure 2B:
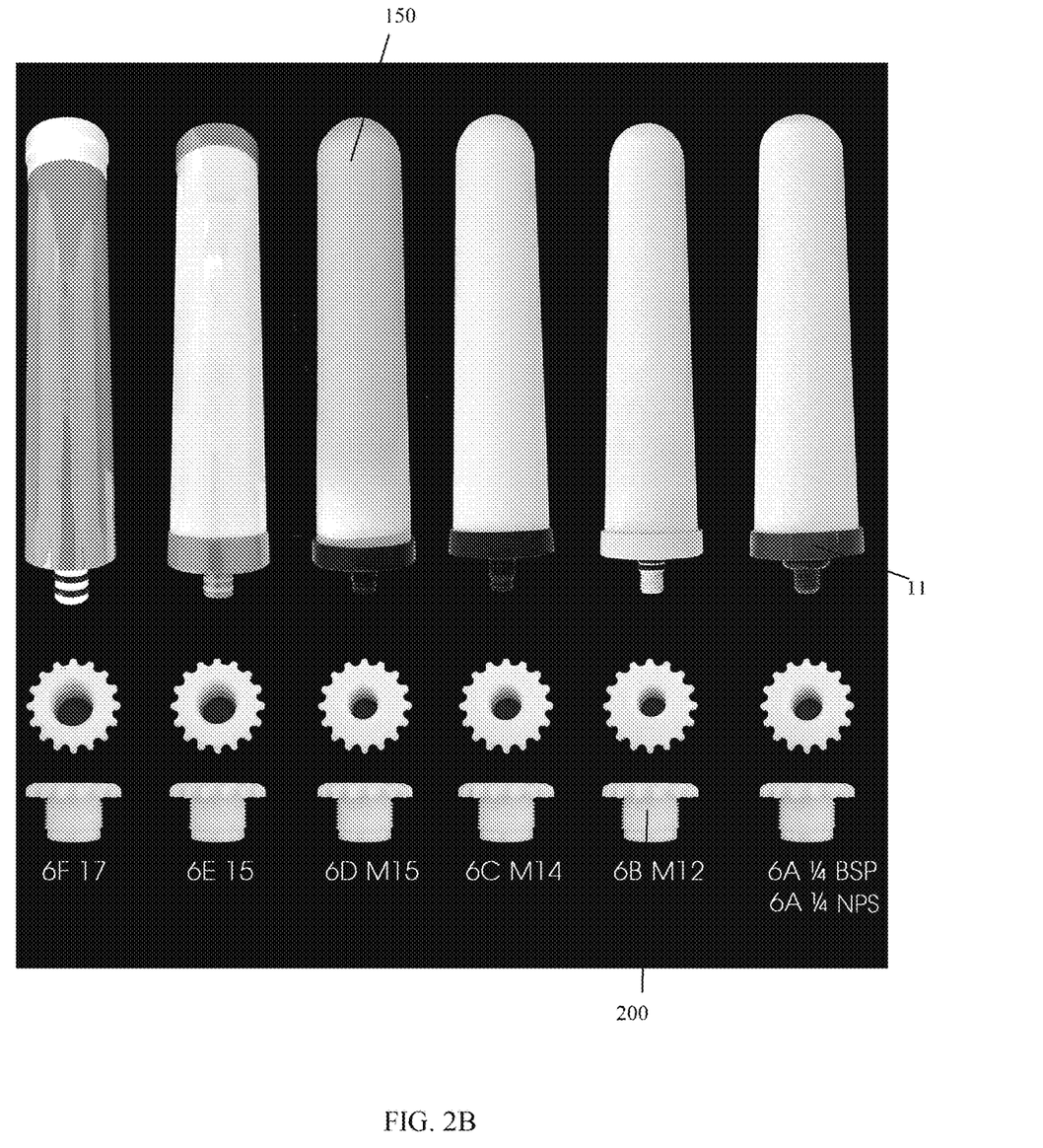
FIG. 2B illustrates a series of adaptors which fit with matching fittings of existing filter elements.

FIG. 2A shows a filter apparatus 100a according to a variation of the above embodiment. In the filter apparatus 100a, the filter element 150 may be supplied with an existing cap 11, where the neck 12 may be threaded with a size like M12-M17, ¼ BSP or ¼ NPS. Element 13 is an O ring provided for water tight sealing. To fit the neck 12 to the smal(ler) stepped-opening 111, such as threaded connection 114, an adaptor 200 is provided for intermediate connection between the neck 12 and the base member 110. This embodiment is useful as some users already have filter elements supplied with existing necks 12 that do not fit with the base member 110. After these filter elements have been used up, users can then buy the filter elements 150 with caps 151 that fit with the base member 110, and so can enrich the filtered water according to one's needs. By providing these adaptors 200, the existing filter elements with necks 12 are not wasted.

Figure 6A:
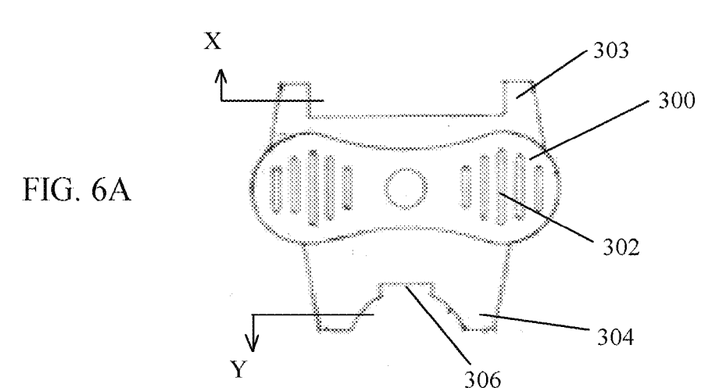
FIG. 6A illustrates a key for use with the above filter apparatus, whilst

FIGS. 2A-2B show the adaptor 200. The adaptor 200 has a T-shaped head 202, a threaded end 204 and an interior opening 206. The interior opening 206 is threaded for connection with the threaded neck 12, whilst the threaded end 204 connects with the threaded connection 114 at the base member 110. The peripheral edge of the T-shaped head 202 has notches, which notches allow a user to turn the adaptor 200 during installation into the base member 110 or to turn the adaptor for removal, for eg, during maintenance or cleaning. A key 300, shown in FIG. 6A, is supplied for turning the adaptor 200, besides turning a closure cap 195 associated with the cavity for receiving the hydrogen capsule 190 and port opening 118 or a bleed valve 124 associated with the filter housing 120 of the present invention.

Figure 4A:
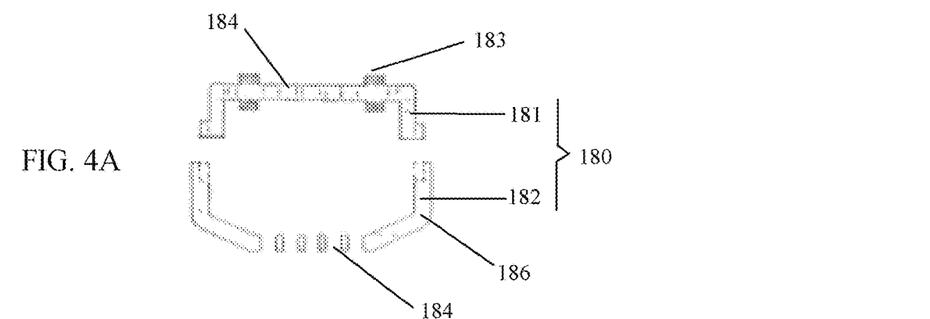
FIGS. 4A-4C illustrate a shell capsule for use in the base member shown in FIGS. 1A and 2A.
Figure 4B:
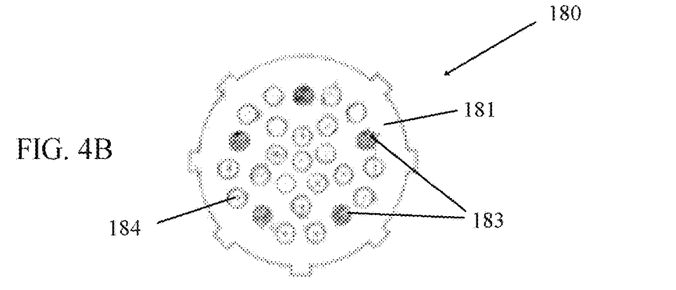
Figure 4C:
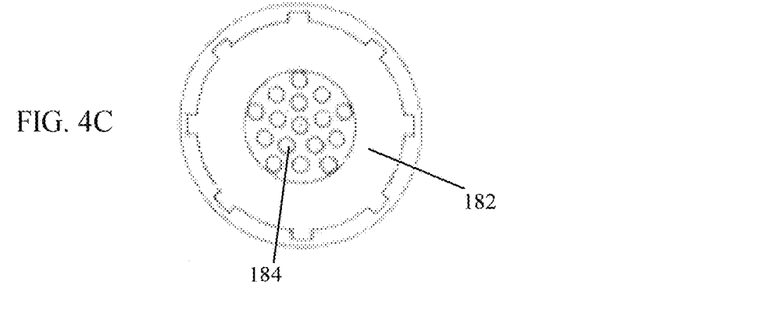

To further enrich and/or enhance the nutrient-rich water, it is possible to provide a shell capsule 180 to contain some desired material in a small quantity, such as magnesium, germanium, pearl and so on. In one embodiment, the shell capsule 180 is made of two hollow halves 181, 182, which can be opened and then kept closed by means of some catches. The shell capsule 180 has perforated holes 184. An upper surface of the upper half capsule 181 has a plurality of short pins 183. These pins 183 ensure that the holes 184 at the upper surface of the shell capsule are not blocked/obstructed when the shell capsule 180 is in contact with the end of the stick capsule 160, so nutrient-rich water is able to flow through the shell capsule 180. In addition, the shell capsule 180 has a stepped shoulder 186, which allows the shell capsule 180 to be located in the base member 110, for eg., near the end of the smal(ler) stepped-opening 111.

Figure 3A:
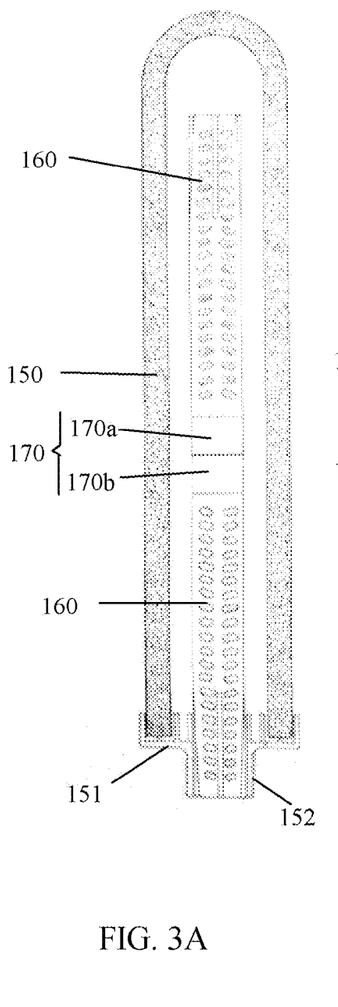
FIG. 3A illustrate a sectional view through an assembly of the filter element and two stick capsules.
Figures 3B, 3C, 3D:
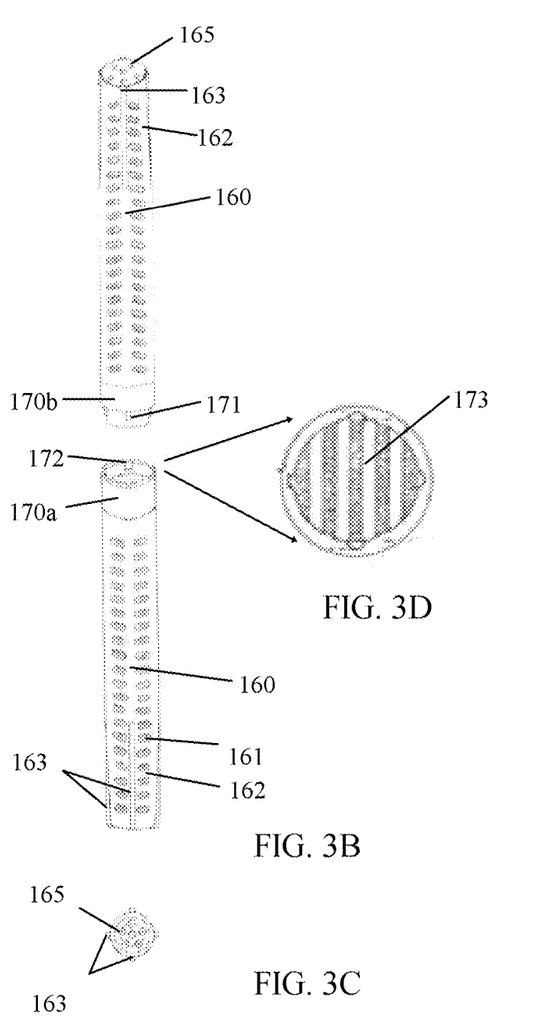
FIG. 3B illustrates an exploded view of an assembly of two stick capsules, whilst
FIG. 3C illustrates an end view of the stick capsule and FIG. 3D illustrates an end view of a pair of connectors joining two stick capsules.

Referring back, FIG. 3A shows an assembly of two stick capsules 160 inside the filter element 150. The stick capsules 160 are butt joined by a pair of matching male and female connectors 170a, 170b, as seen in FIG. 3B. These matching male and female connectors can also be inverted when in use, as seen in FIG. 3A. Matching notches 171 and grooves 172 ensure the male and female connectors 170a. 170b fit in a pair. FIG. 3D shows an enlarged end view of the connectors 170a, 170b, where the interior cavity is open as defined by slots 173. Similarly, the body of the stick capsule 160 is perforated with holes 161 and the end of the stick capsule 160 is also perforated with holes 165, as seen in FIG. 3C.

Figure 3E:
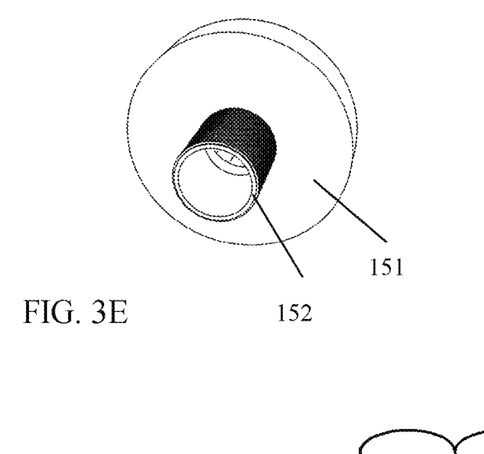
FIGS. 3E-3F illustrate an end cap of the filter element shown in FIG. 1A.
Figure 3F:
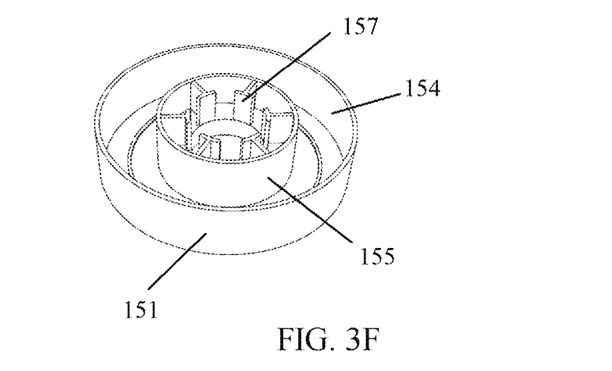
Figure 3G:
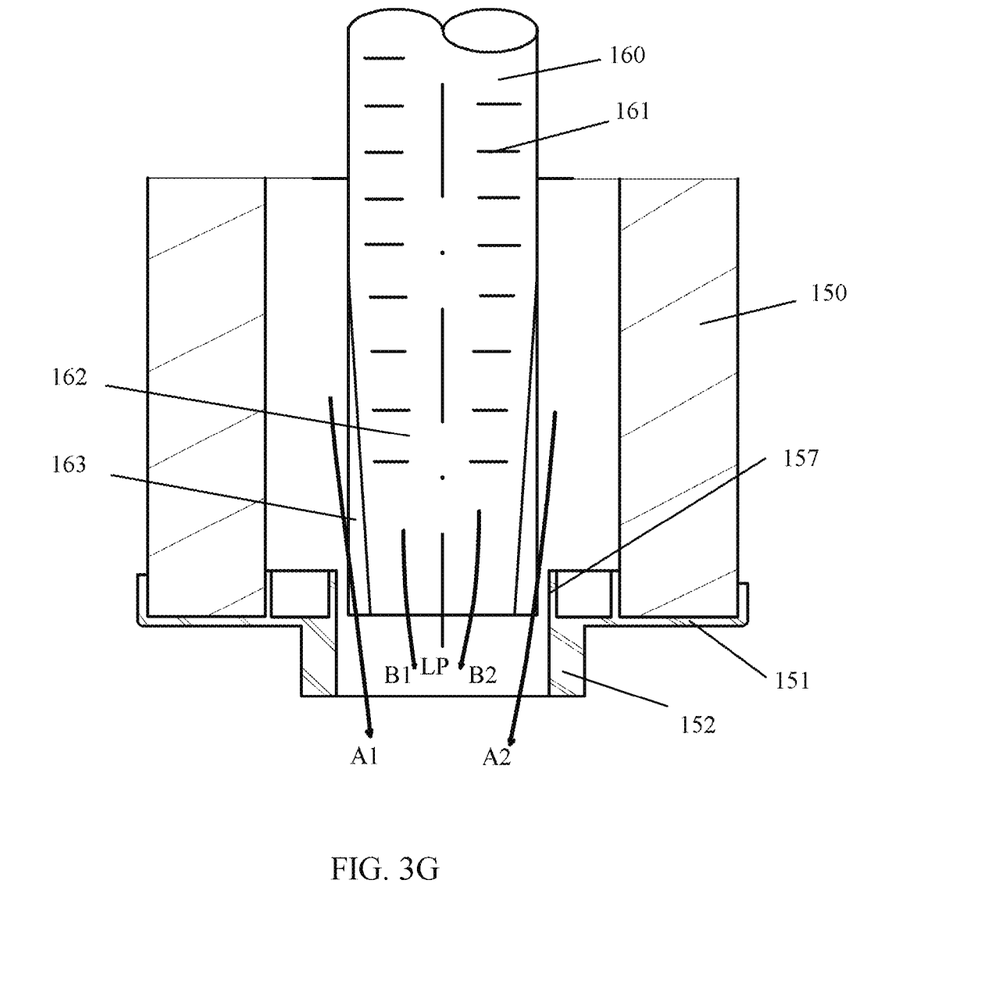
FIG. 3G illustrates a sectional view of an interior of the end cap and an end of the stick capsule showing channels for creating a dynamic water flow pattern.

FIG. 3E-3F show views of the filter element cap 151, whilst FIG. 3G shows part of the stick capsule 160 when assembled inside the cap 151 (by inserting the stick capsule 160 through the centre opening of the cap 151). The inside of the cap 151 has two concentric sidewalls 154, 155; the outer concentric sidewall 154 is shaped and dimensioned to fit with an outside surface the filter element 150, whilst the inner concentric sidewall 155 is shaped and dimensioned to fit with an inside surface of the filter element. Projecting radially inward from the inner sidewall 155 are six T-shaped posts 157 for loosely locating the tapered end 162 of the stick capsule 160. The tapered end 162 of the stick capsule has 4 ribs 163; when the tapered end 162 is located inside the cap 151 by the T-shaped posts, there is an annular space through which the nutrient-rich water flows (as shown by arrows A1 and A2 in FIG. 3G). Inventor has selected 4 ribs 163 in association with 6 numbers of T-shaped posts 157 so that any angular orientation between the ribs 163 and T-shaped posts 157 would not impede the water flow around the tapered end 162 of the stick capsule 160. As the nutrient-rich water flows down the tapered end, there is an increase in the flow speed; this increased flow speed creates a lower pressure (LP) region at the end of stick capsule 160 according to Bernoulli's principle, but is not solely bound by this principle. As the end of the stick capsule is perforated with holes 165, the nutrient-rich water inside the stick capsule 160 is gradually induced, drawn or sucked out of the stick capsule (as shown by arrows B1 and B2) and mix/blend with the outer streams of water. When the faucet is not discharging nutrient-rich water or the filtered water is substantially not flowing, the nutrient-rich water does diffuse out through holes or perforations 161 formed along the length of each stick capsule. For eg., there may be four rows of holes/perforations 161. An advantage of the present invention is the creating of a dynamic flow of water around the tapered end of the stick capsule, creating turbulence in the water flow by the T-shaped posts, inducing/sucking of nutrient-rich water through the end of the stick capsule and mixing/blending of the nutrient-rich water with the rest of the filtered water flowing out from inside the filter element 150. In this way, the present invention provides a filter apparatus in which a user has freedom to choose combinations of nutrients, ions, flavours or treatment of the filtered water for consumption or use without having to buy several types of filter apparatuses dedicated for each nutrient or treatment. Coupled with the compact sizes of the component parts, the filter apparatus 100, 100a is also made more affordable and of an esthetic design. In addition, there is no need for electricity to operate this filter apparatus.

Figure 5A:
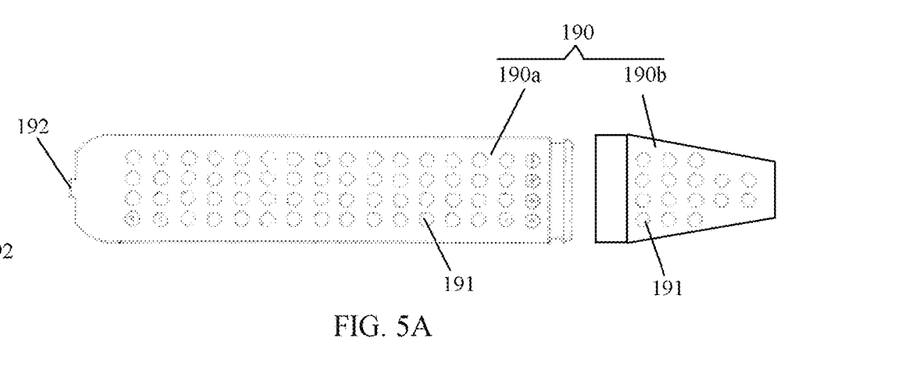
FIGS. 5A-5B illustrate a hydrogen capsule for use in the base member shown in FIGS. 1A and 2A, whilst
Figure 5B:
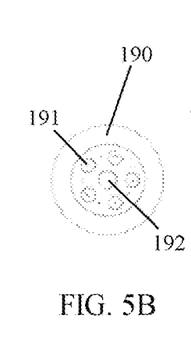
Figure 5C:
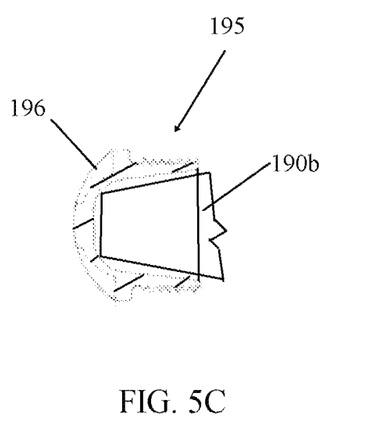
FIGS. 5C-5D illustrate a closure cap associated with a cavity for receiving the hydrogen capsule.
Figure 5D:
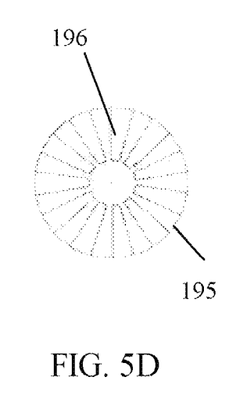

FIG. 5A shows the hydrogen capsule 190 is made up of two parts 190a, 190b. The interior of the hydrogen capsule is hollow and the shell of the hydrogen capsule 190 is perforated with holes 191. As described above, hydrogen rich granules or balls are contained in the hydrogen capsule and hydrogen is slowly infused or transformed by immersion into the water. As can be seen in FIG. 5A there is a pin 192 on an end of the left hand part 190a, also seen in the end view in FIG. 5B. The pin 192 ensures that the there is a gap between the end of the left hand part 190a when the hydrogen capsule 190 is assembled inside the cavity 116, so that water flow around and through the hydrogen capsule is not impeded. As seen from FIG. 5A, the right hand part 190b is substantially tapered; the tapered end part fits snugly with an interior of the closure cap 195 (as seen in FIG. 5C) so that the hydrogen capsule 190 is inserted into the cavity 116 in only one direction. FIG. 5D shows an exterior surface of the closure cap 195 has grooves 196. There are 11 grooves; the grooves are arranged so that a pair of opposing grooves 196 engage with a pair of teeth 304 formed on the key 300, such that the pair of teeth 304 lay on a plane 305 (as seen in FIG. 6C); the 11 numbers of grooves and arrangement of two substantially opposing grooves on a plane ensure one direction of fitting the teeth 304 into the grooves 196.

Figure 6B:
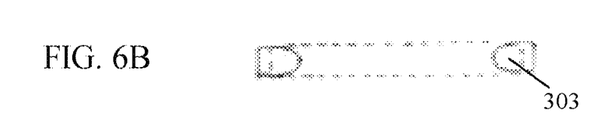
FIG. 6B illustrates a section of the teeth at section line X and FIG. 6C illustrates a section of the teeth at section line Y.
Figure 6C:
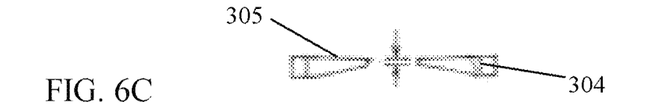

Referring back, FIG. 6B shows a section X of the key 300 through teeth 303. Teeth 303 is shaped and dimensioned to engage with notches on the T-shaped adaptor head 202 for turning the adaptor 200 into or out of the base member 110. Near the teeth 304, there is a notch 306; the notch 306 is for engaging with a bleed valve 124 located on top of the filter housing 120. By bleeding air from inside the filter housing, water can occupy the entire volume inside the filter apparatus. Also as seen in FIG. 6A, the sides of the key 300 are formed with striations 302, which help to provide positive grip between a user's thumb and fingers.

As a reader would realise, the filter apparatus 100, 100a of the present invention is compact and does not require electricity to operate. Another advantage is the ease of maintenance, and a wide choice of enriching materials a user can choose from according to one's need.

While specific embodiments have been described and illustrated, it is understood that many changes, modifications, variations and combinations thereof could be made to the present invention without departing from the scope of the invention. For eg., the filter element 150 may be made of ceramic, PP, cotton fibres, membrane and so on. Preferably, the materials of the filter housing, base member, fittings, capsules, cap and so on are selected from food grades of polymers such as PP, PCTG, ABS, PA, etc. FDA grades of PP, PCTG, ABS, PA, etc are also preferred. BPA-free PCTG is also preferred; preferably, the tubings are made from FDA grade TPU. Whilst a counter-top water filter apparatus has been shown and illustrated, the manner of filtering and enriching filtered water is applicable for an under-sink filter apparatus; it is also possible that the above filtering and enriching system be incorporated into an in-cabinet type of filtering apparatus.

What is claimed is:

1. A water filter apparatus comprising:
a water inlet and a water outlet separately connected to a base member;
the water inlet fluidly leading to a filter housing, in which is disposed a filter element; and
a stick capsule, which hollow interior contains water treating material, is disposed inside the filter element, with the stick capsule having a tapered end, rows of holes formed along a length of the stick capsule and a plurality of holes formed at the end of the tapered end, so that treated water drawn from the interior of the stick capsule is mixed with filtered water flowing around the tapered end and the mixed water is fluidly discharged through the water outlet for use.

2. The apparatus according to claim 1, wherein an end of the filter element is sealed with a cap, which cap is hollow and the cap has a projected neck that fits into the base member.

3. The apparatus according to claim 2, wherein the cap further comprises two concentric sidewalls, namely, an outer sidewall and an inner sidewall, with the outer sidewall to fit an exterior surface of the filter element and the inner sidewall to fit an interior surface of the filter element, and a plurality of T-shaped posts extend radially from the inner sidewall.

4. The apparatus according to claim 3, wherein the stick capsule has a plurality of ribs and when the apparatus is assembled, the tapered end of the stick capsule is located in the hollow interior of the cap, so that filtered water flows in channels formed between the stick capsule and the T-shaped posts.

5. The water filter apparatus according to claim 2, further comprising:
a screw adaptor, with an internal opening and an external thread, the internal opening for receiving the projected neck of the cap, and the external thread for connecting with the base member.

6. The apparatus according to any one of claim 2, wherein the projected neck of the cap is threaded or non-threaded.

7. The apparatus according to claim 1, wherein the water treating material comprises nutrient-rich, anti-bacterial, anti-chlorine, inorganic ions, organic ions, oxygen-reduction negative potential ceramic, negative ion ceramic, far infrared stone, magnetic, inhibiting scale or magnesium material.

8. The apparatus according to claim 1 comprising two stick capsules, wherein the two stick capsules are butt connected through a pair of matching male and female connectors.

9. The apparatus according to claim 1, further comprising a shell capsule for fitting in the base member.

10. The apparatus according to claim 9, wherein the shell capsule is hollow and is made up of an upper half and a lower half, with pins on an exterior of the upper half to facilitate fluid flow through holes in the shell capsule.

11. The apparatus according to claim 1, further comprising a hydrogen capsule for fitting in the base member.

12. The apparatus according to claim 11, wherein the hydrogen capsule is hollow and is made up of a left hand shell and a right hand shell, with a pin located on an exterior end of the left hand shell and the right hand shell is substantially tapered to ensure one way of fitting into a cavity in the base member for receiving the hydrogen capsule.

13. The apparatus according to claim 12, further comprising a closure cap for fitting with a port of a receiving cavity of the hydrogen capsule.

14. A kit of a water filter apparatus according to claim 1 comprising:
    an inlet fitting and outlet fitting;
    the base member with an inlet port and outlet port for respectively receiving the inlet and outlet fittings;
    the filter housing for fitting with the base member;
    the filter element for fitting into the filter housing;
    the stick capsule for fitting inside the filter element; and
    a shell capsule for fitting into the base member.

15. The kit according to claim 14, further comprising a hydrogen capsule for fitting into the base member.

16. The kit according to claim 14, further comprising a cap for sealing an end of the filter element, which cap is hollow, and an opening in the hollow cap is shaped and dimensioned to receive the stick capsule.

17. The kit according to claim 16, further comprising a pair of matching male and female connectors for connecting two stick capsules in a butt joint.

18. The kit according to claim 14, further comprising a set of screw adaptors for fitting with the base member.

19. The kit according to claim 18, further comprising a key, which has teeth to engage notches on the screw adaptors, teeth to engage a closure cap on a port on the base member associated with a hydrogen capsule, or a notch to operate on a bleed valve located on the filter housing.

20. A water filtering and integrated water treating or enriching process comprising:
    allowing water to flow into a base member;
    directing the water into a filter housing;
    passing the water through a filter element disposed in the filter housing;
    disposing an apertured stick capsule containing water treating material within the filter element, so that a tapered end of the stick capsule is located around a hollow cap sealing an end of the filter element, such that filtered water flowing down the tapered end along an outer side of the stick capsule creates a low pressure region at the end of the stick capsule, which low pressure region draws or sucks treated water from inside the stick capsule and mixes or blends with the filtered water; and
    directing the mixture of water from inside the base member through an outlet for discharge.

21. The process according to claim 20, further comprising contacting the water with nutrients disposed in a shell capsule which fits into the base member.

22. The process according to claim 20, wherein the water treating material is encapsulated as granules or balls selected from the following: tourmaline, ORP negative potential ceramic, negative ion ceramic, mineral water ceramic, maifanshi stone ceramic, far infra-red stone, magnetic energy material, hydrogen rich material, micro-porous antibacterial, inhibiting scale material, filter ceramic, hydrogen-water media-rolled magnesium and chlorine removal material.

23. The process according to claim 20, wherein the water treating material comprises nutrients, minerals (organic and inorganic), ions, vitamins, herbs, stones, metal, or ceramic.

24. The process according to claim 20, wherein the filtered water is treated with flavor, an anti-bacterial treatment, an anti-chlorine treatment, hydrogen, or activated carbon.

* * * * *